United States Patent
Milholland et al.

(10) Patent No.: US 10,541,100 B2
(45) Date of Patent: Jan. 21, 2020

(54) REMOTE POWER AND OPERATING DEVICE FOR A CIRCUIT BREAKER

(71) Applicant: ABB Schweiz AG, Baden (CH)

(72) Inventors: Bill Milholland, Florence, SC (US); Shawn Shockey, Florence, SC (US); Nolan Mikell, Florence, SC (US); Tim Fricano, Florence, SC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/237,092

(22) Filed: Dec. 31, 2018

(65) Prior Publication Data

US 2019/0206649 A1 Jul. 4, 2019

Related U.S. Application Data

(60) Provisional application No. 62/612,375, filed on Dec. 30, 2017.

(51) Int. Cl.
| | | |
|---|---|---|
| *H01H 71/12* | (2006.01) | |
| *H01H 13/14* | (2006.01) | |
| *H01H 71/66* | (2006.01) | |
| *H02H 3/05* | (2006.01) | |
| *H02H 1/06* | (2006.01) | |
| *H02J 7/00* | (2006.01) | |

(52) U.S. Cl.
CPC .......... *H01H 71/128* (2013.01); *H01H 13/14* (2013.01); *H01H 71/66* (2013.01); *H02H 3/05* (2013.01); *H02H 1/06* (2013.01); *H02J 2007/0095* (2013.01)

(58) Field of Classification Search
CPC ...... H01H 71/128; H01H 71/66; H01H 13/14; H02H 3/05; H02H 1/06; H02J 2007/0095
See application file for complete search history.

(56) References Cited

U.S. PATENT DOCUMENTS

| | | | |
|---|---|---|---|
| 5,471,359 A | 11/1995 | Simpson et al. | |
| 5,875,087 A | 2/1999 | Spencer et al. | |
| 6,038,516 A | 3/2000 | Alexander et al. | |
| 6,295,190 B1 | 9/2001 | Rinaldi et al. | |
| 7,391,299 B2 | 6/2008 | Bender et al. | |
| 7,693,607 B2 | 4/2010 | Kasztenny et al. | |
| 8,319,372 B2* | 11/2012 | Terricciano | H02J 13/0079 307/39 |
| 9,478,382 B1* | 10/2016 | Aromin | H01H 83/02 |
| 2013/0329331 A1* | 12/2013 | Erger | H02H 1/0084 361/102 |
| 2018/0034266 A1 | 2/2018 | Vasefi et al. | |

FOREIGN PATENT DOCUMENTS

GB       2557938 A * 7/2018 ............... H02H 1/06

OTHER PUBLICATIONS

Wikipedia contributors. "Circuit breaker." Wikipedia, The Free Encyclopedia. Wikipedia, The Free Encyclopedia, Sep. 7, 2019. Web. Sep. 9, 2019. (Year: 2019).*

* cited by examiner

*Primary Examiner* — Daniel J Cavallari

(74) *Attorney, Agent, or Firm* — Taft Stettinius & Hollister LLP; J. Bruce Schelkopf

(57) ABSTRACT

A system for electrically operating a circuit breaker remotely and during period of a power outage is provided. The system has a power source, power cable, control unit, control device, and a circuit breaker port for connecting the power source and control unit to the circuit breaker, for actuation of the circuit breaker operating mechanism.

5 Claims, 3 Drawing Sheets

33B

33A

REMOTE POWER AND OPERATING DEVICE FOR A CIRCUIT BREAKER

FIELD OF INVENTION

The present application is directed to a circuit breaker remote operation device.

BACKGROUND

In a situation of control power loss, electrically operated circuit breakers that have an electromagnetic operation mechanism cannot be remotely operated. The circuit breakers may be in a location that is not easily accessible for providing control power to the switchgear in which the impacted circuit breaker is installed. There is room in the art for remote actuation of circuit breakers.

BRIEF DESCRIPTION OF THE DRAWINGS

In the accompanying drawings, structural embodiments are illustrated that, together with the detailed description provided below, describe exemplary embodiments of a powered remote operating umbilical device. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
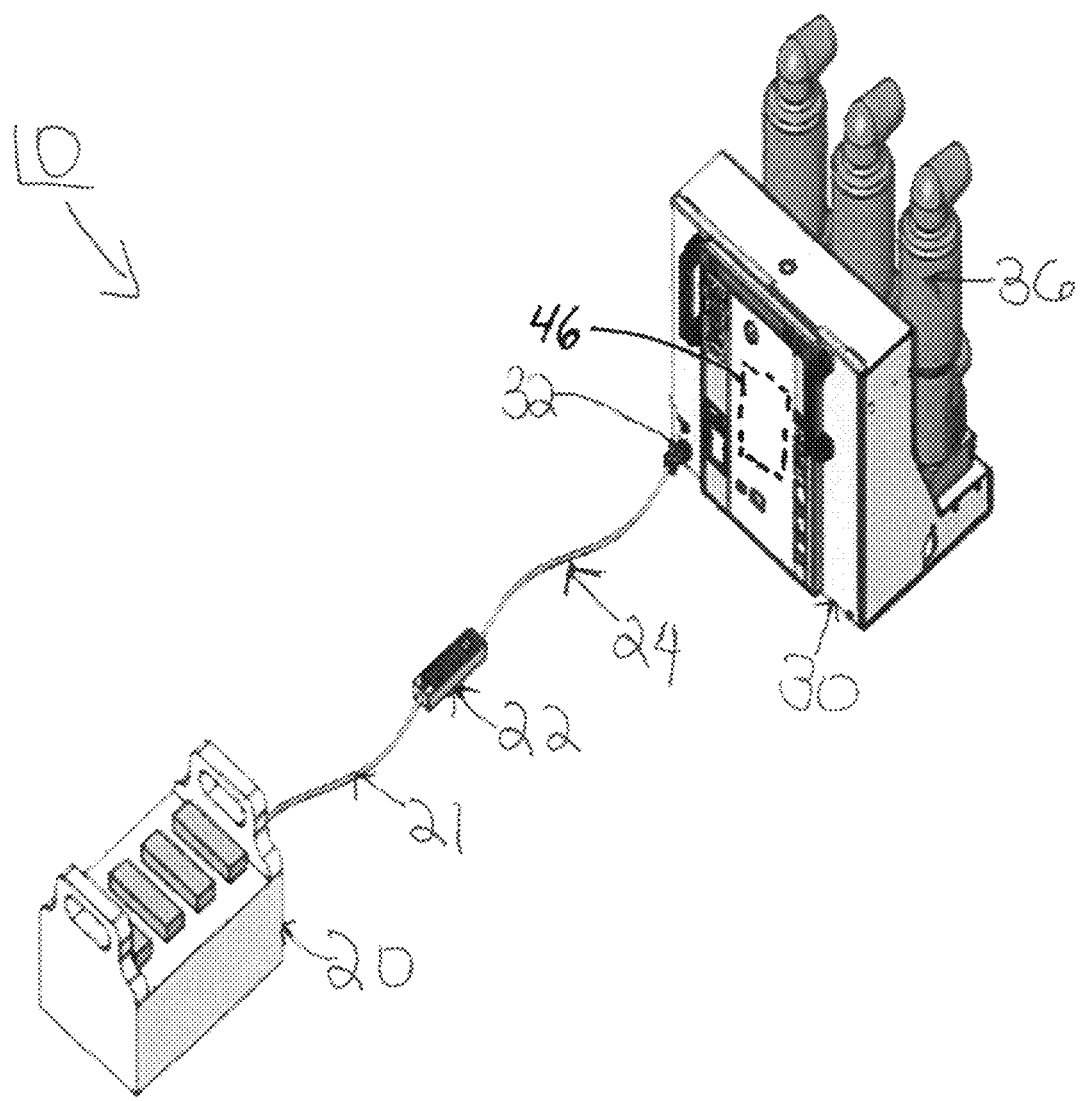
FIG. 1 shows a system for remote circuit breaker operation.
Figure 2:
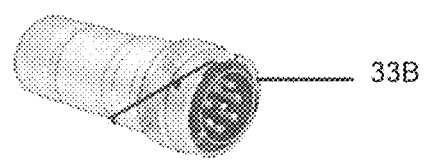
FIG. 2 shows a plug connector for connecting the control cable to the circuit breaker.
Figure 2:
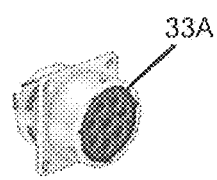
Figure 3:
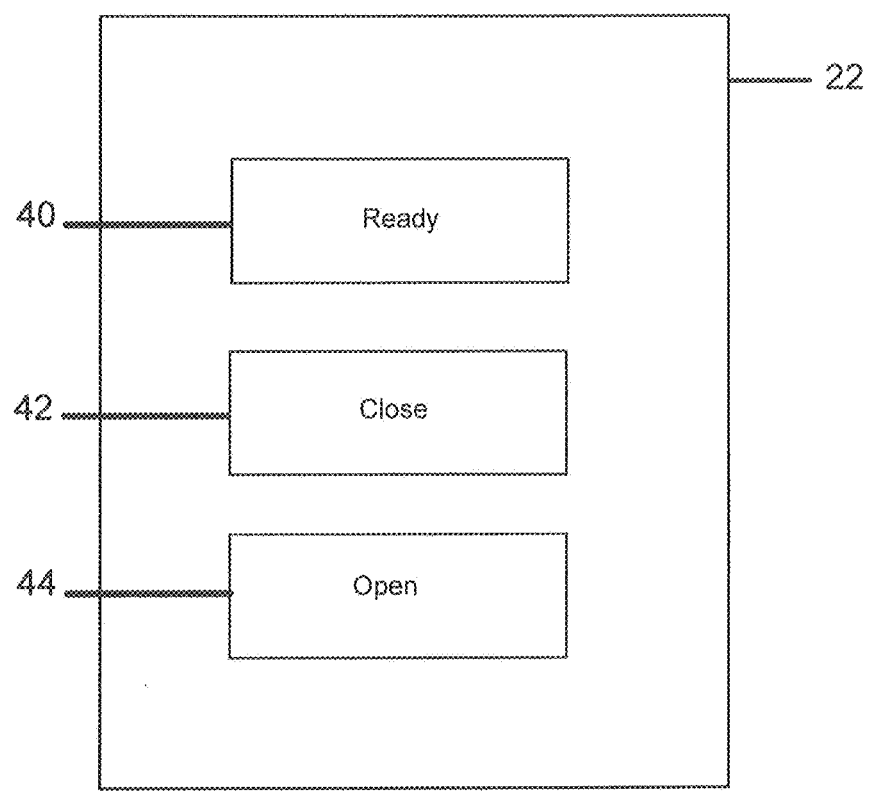
FIG. 3 shows pushbuttons of the control device.

With reference to FIG. 1, a system 10 for remotely operating an electronically actuated circuit breaker 30 is shown. The system 10 has a power supply 20, a control device 22 for circuit breaker 30 operations, a circuit breaker 30, a power cable 21, a control cable 24 for connecting the control device 22 to a port 32 of the circuit breaker 30, and a toggle 38 for selecting the power source for actuating the circuit breaker 30. The port 32 is preferably a plug connector such as a female plug connector 33A for receiving a male plug connector 33B of the control cable 24. The control cable 24 along with the port 32 and circuit breaker 30 act as an umbilical connection to power and actuate the circuit breaker 30 operating mechanism.

An internal wiring harness (not shown) interfaces with the control board 46 resident in the circuit breaker 30 and the circuit breaker 30 can be controlled through the wiring harness connection. Remote operation of the circuit breaker 30 in a switchgear or switchboard cubicle (not shown) means operation by a human operator from a few feet away from the circuit breaker 30 to the operation of the circuit breaker 30 from a distance of miles away from the physical circuit breaker 30 installation. The distance of the operator from the circuit breaker during operation may be dependent upon the length of the control cable 24.

The system 10 of FIG. 1 is useful in a power outage because the system 10 restores control power to the circuit breaker 30. The circuit breaker 30 has a control unit 46 interfaced with the system 10 that has a printed circuit board 46 and wiring harness for the control functions of the circuit breaker. These functions include, but are not limited to: basic operating (open and close), safety interlocking, user configuration interface, system operating thresholds.

Additionally, the system 10 allows for the remote operation of the magnetically actuated circuit breaker 30. The remote circuit breaker 30 operation can be conducted at a safe distance when the circuit breaker 30 is installed in a switchgear unit by means of the fully extended control cable 24 provided with the system 10. The operator can actuate the circuit breaker 30 in open and close operations including but not limited to disconnected and connected positions of the vacuum type circuit breakers 30.

The control device 22 has a control housing with a membrane pushbutton, printed circuit board adapter and a cut-out switch. The control device 22 may have a ready lighted pushbutton 40, a close pushbutton 42, and an open pushbutton 44. The control device 22 may use the power source 20 or be plugged in to an external power source to power the circuit breaker 30 and allow operation of the circuit breaker 30 between open and closed positions.

The system 10 of FIG. 1 is operable for magnetically actuated circuit breakers 30 and the signal that is transmitted to the circuit breaker 30 by the system 10 allows the circuit breaker 30 to be operated. Additionally, the circuit breaker 30 control power can be fully powered using the system 10 of FIG. 1. For example, if the switchgear (not shown) control power source is available, the system 10 can still be connected to the circuit breaker 30 to provide local operating control at the distance of the length of the control cable 24 without the necessity of an external power source. A toggle 38 may be provided for selecting the source of power to be used to actuate the circuit breaker 30, including the control electronics. Thus, where local power wired directly into the circuit breaker 30 is available, the toggle 38 may be switched to use local power to control the circuit breaker 30. In this instance, the control cable 24 and control device 22 may be used to control the circuit breaker 30 without the need for the external power supply 20 and power cable 21 to provide remote control of the circuit breaker 30. Alternatively, where there has been a loss of local power, the toggle 38 may be switched to use power from the external power supply 20 to control the circuit breaker 30. Thus, the remote control device 22 may be used with or without the external power supply 20.

In one embodiment, the circuit breaker 30 actuation is accomplished by remote operation from a remote location. The circuit breaker 30 is then moved into an alternate racking position with respect to switchgear primary lead contact of the switchgear (not shown) in which the circuit breaker 30 is housed. It should be understood that racking of the switchgear refers to the moving into connection and withdrawing from connection of the circuit breaker contacts with the contacts in the corresponding switchgear (not shown) cabinet cell.

While the system 10 is applicable for magnetically actuated circuit breakers 30 such as those that have a shaft, a closing coil, permanent magnets, a plunger and an opening coil, it should be understood that the system 10 can be applied to any circuit breaker 30 capable of being operated through a cable connection between the control device 22 and circuit breaker for opening and closing the circuit breaker 30.

A method of operation for the remote circuit breaker system 10 is to select the operation mode as open coil/open contacts 36 (44), close coil/close contacts 36 (42), or power test on the control device 22 (40). The signal is then sent from the control device 22 through the control cable 24 to the port 32 of the circuit breaker 30. The circuit breaker 30 is then actuated to the open or close state. Circuit integrity of the control unit within circuit breaker 30 is tested via cut-out switch actuation of control device 22. Lighted indication of the ready light 40 in the membrane switch of control device 22 is achieved once power has been supplied through the control cable 24 and successfully energized the control circuit on the control unit within circuit breaker 30.

The system 10 is provided with safety features such that an actuation command to close or open the circuit breaker, cannot be performed while the other command is active in the system 10. For example the open circuit breaker actuation command cannot be sent, when a close circuit breaker command is active in the system 10.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

The invention claimed is:

1. A system for remote operation of a circuit breaker, comprising:
   a control device for controlling the opening and closing of the circuit breaker through actuation of a circuit breaker operating mechanism;
   a local power source directly wired to the circuit breaker;
   a port on the circuit breaker for interfacing with a circuit breaker control board that performs the circuit breaker actuation operations;
   a control cable connected between the control device and the port of the circuit breaker, the control cable for sending a control signal to actuate the circuit breaker operating mechanism; and
   an external power source connected to the control device with a power cable;
   wherein the control device and the external power source provide power and the control signal to open and close the circuit breaker upon a loss of the local power source.

2. The system according to claim 1, further comprising a toggle to select the power source between the local power source directly wired to the circuit breaker and the external power source connected to the control device with the power cable.

3. The system according to claim 1, wherein the port comprises a first plug connector and the control cable comprises a second plug connector for connecting to the first plug connector.

4. The system according to claim 1, wherein the control device comprises a first control to close the circuit breaker and a second control to open the circuit breaker.

5. The system according to claim 4, wherein the first and second controls are first and second pushbuttons.

\* \* \* \* \*